Dec. 8, 1931.                J McE. SMITH                1,835,347

COUPLING FOR LUBRICATING SYSTEMS

Filed Feb. 7, 1929

Inventor
J. McElroy Smith
By Fred Gerlach Atty.

Patented Dec. 8, 1931

1,835,347

UNITED STATES PATENT OFFICE

J McELROY SMITH, OF COLUMBUS, OHIO

COUPLING FOR LUBRICATING SYSTEMS

Application filed February 7, 1929. Serial No. 338,102.

The invention relates to devices used in lubricating systems and more particularly to the couplers whereby fittings on bearings are connected to the supply means, such as a flexible pipe through which the lubricant is delivered from a compressor.

The primary objects of the invention is: to provide a coupling device, in which a spring-pressed element for effecting a seal between the fitting and the coupling is dispensed with, in which a seal is formed between the fitting and a member of the coupling device by a screw-threaded member which can be easily and quickly manipulated to connect and disconnect the coupling, which is simple in construction and can be produced at a low cost, which is adapted for ready connection to, and disconnection from, the lubricant supply hose, and in which a gasket for forming a seal against the fitting may be readily replaced when it becomes worn. Other objects will be apparent from a consideration of the following detailed description.

The invention consists in the several novel features hereinafter set forth and more particularly defined by claims at the conclusion hereof.

Figure 1:
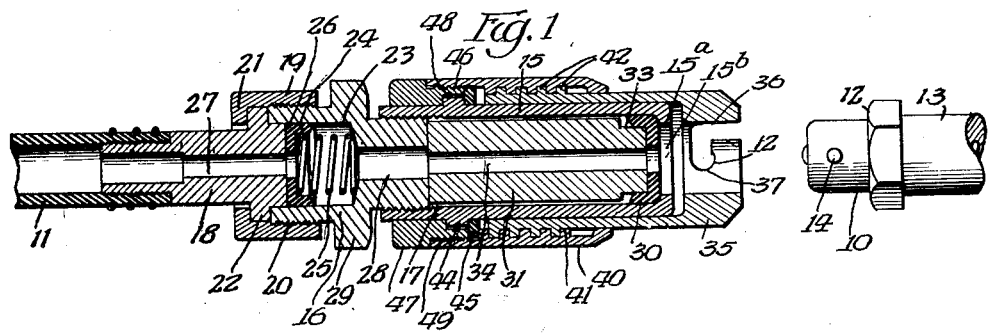
Figure 2:
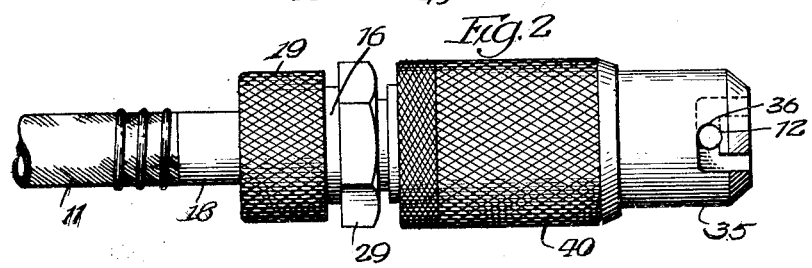
Figure 3:
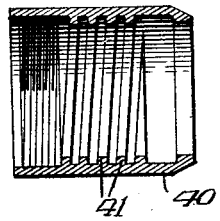
Figure 4:
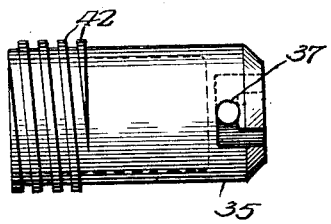
Figure 5:
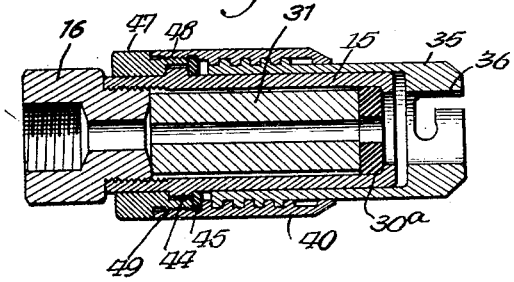
Figure 6:
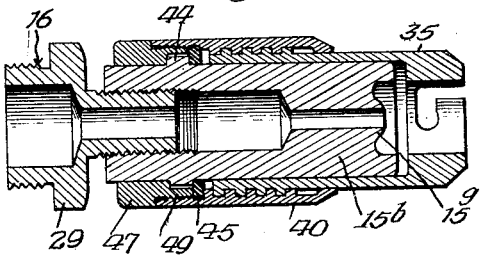

In the drawings: Fig. 1 is a longitudinal section of a coupling embodying the preferred form of the invention. Fig. 2 is a side elevation. Fig. 3 is a detail section of the adjusting sleeve for the coupling sleeve. Fig. 4 is a side elevation of the coupling sleeve. Fig. 5 is a longitudinal section of a modified form of the invention. Fig. 6 is a longitudinal section of another modified form of the invention.

The invention is exemplified in a coupling which is adapted to connect a fitting 10 and a flexible hose 11 which is connected to a supply of grease under pressure to deliver grease into the fitting. The fitting is usually provided with a spring-closed valve 12 for closing a duct 13 leading to the bearing to which the fitting is connected and with laterally projecting studs 14 forming one element of a bayonet catch for connecting the coupling to the fitting.

The improved coupling comprises a barrel or cylindrical body 15 which is fixedly connected to the hose 11 by means of a nipple 16 which is screw-threaded, as at 17, into the inner end of the barrel 15; a stud 18 to the inner end of which the hose 11 is fixedly secured; and a collar 19 which is screw-threaded, as at 20, to the inner end of nipple 16 and has an annular shoulder 21 to clamp a flange 22 on the stud against the inner end of nipple 16. The outer end of stud 18 extends into an enlarged bore 23 in nipple 16 and a cup-shaped gasket 24 is pressed against the outer face of the stud by a spring 25. A grease duct 27 extends centrally through the stud 18 to the enlarged bore 23 and a duct 28 extends through nipple 16. The latter is provided with a polygonal flange 29, so that the nipple may be turned into the barrel 15. The outer end of the barrel is inturned to form a shoulder 15ª for a gasket 30 which is adapted to be clamped against the outer end of fitting 10 to form a tight seal and prevent leakage of grease between the fitting and the coupling. A plunger 31 extends between the washer 30 and the outer end of nipple 16, and fits loosely in barrel 15, so that it may be forced outwardly by the nipple to clamp the washer 30 against shoulder 15ª and thus secure the washer in the barrel. Upon unscrewing the nipple 16 from the barrel, the plunger 31 may be removed so the washer can be replaced when desired. In the form of the invention illustrated in Fig. 1, washer 30 is cup-shaped and the outer end of plunger 31 has a peripheral groove 33 to confine the side of the cup-shaped washer between the barrel and the plunger. In the modification shown in Fig. 5, a flat washer 30ª is used and the annular groove in the plunger is dispensed with. Plunger 31 has a duct 34 extending longitudinally therethrough for delivering the lubricant under pressure to the outer end of the barrel.

A coupling sleeve 35 fits around the periphery of the outer portion of the barrel 15 and is slidable longitudinally on or relatively to the barrel. The outer end of sleeve 35 has a cylindrical opening 36 and angular grooves 37 to receive the stud 14 of the pin fitting. By slipping the end of sleeve 35 over the fitting 10 with the studs 14 in the grooves 37, and then rotating the coupling sleeve, the latter will be locked to the fitting, and by reverse manipulation it will be uncoupled from the fitting. The outer end of the barrel 15 has an opening 15$^b$ corresponding in size to opening 36, through which the outer end of the body of the pin-fitting 10 may pass into engagement with the outer face of washer 30.

An adjusting sleeve 40, for shifting the coupling sleeve 35 longitudinally to draw the fitting 10 to and from the washer 30, is rotatable around barrel 15 and coupling sleeve 35 and is confined against longitudinal movement on or relatively to the barrel 15. Sleeve 40 is formed with an internal screw-thread 41 and sleeve 35 with an external thread 42 engaging with said internal thread, so that by rotation of the adjusting sleeve 40 the coupling sleeve 35 may be positively operated longitudinally of the barrel 15 to shift the fitting 10 into and out of the opening 15$^b$ of the barrel. The outer periphery of sleeve 40 is knurled, so that it may be readily gripped for turning. For the purpose of confining the sleeve 40 against longitudinal movement on the barrel 15 while permitting said sleeve to rotate thereon, an annular flange 44 is formed on the periphery of the barrel adjacent its inner end. A washer 45 engages the shoulder 46 in the sleeve 40, and a collar 47 having a recess 48 fitting around the flange 44, is screw-threaded, as at 49, to the inner end of sleeve 40 to clamp washer 45 against shoulder 46 in properly spaced relation to leave the sleeve free for rotation around the barrel 15, but confining it against longitudinal movement. The collar 47 and washer 45 provide a simple construction which may be produced at a low cost for removably connecting the coupler sleeve and the barrel, so that they may be replaced when desired.

In operation, the sleeve 35 is slipped over the fitting 10 and rotated to lock the sleeve and fitting together. Next, the adjusting sleeve 40 is turned in one direction to cause its screw-threaded connection with the coupling sleeve 35 to draw the latter firmly against the washer 30 so that a tight seal will be formed to prevent leakage of lubricant around the fitting. The grease will then be forced through the coupling into the fitting, as well understood in the art. When the greasing has been completed, the adjusting sleeve 40 will be rotated in the opposite direction to withdraw the fitting 10 from the barrel 15, and the sleeve 35 is then uncoupled from the fitting.

In Fig. 6 is illustrated a modified form of the invention in which the barrel 15$^f$ is provided with an integral convex seat 15$^g$ which is adapted to engage and be securely clamped against the fitting 10. This exemplifies a construction for use in which a metal-to-metal seal is desired.

The invention exemplifies an improved coupling for lubricating systems in which the fitting and coupling are adapted to be drawn together into tightly fitting relation by a screw-sleeve; which is simple in construction, in which all of the parts can be removed for replacement and can be easily assembled.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a coupling for lubricating systems, the combination of a barrel, a nipple at one end of the barrel for connecting said barrel to a source of lubricant-supply, a coupling-sleeve mounted to slide longitudinally on the outside of the barrel and provided with means whereby it may be detachably interlocked with a fitting, a washer forming a seat for the fitting in the other end of the barrel, a member disposed in the barrel and clamped against the washer by the nipple in order to hold the washer in place, a rotatable adjusting-sleeve held against longitudinal movement on the barrel, and a screw-thread connection between the sleeves adapted upon rotation of the adjusting sleeve in one direction to effect relative longitudinal movement of the barrel and coupling-sleeve and clamp the fitting and seat together.

2. In a coupling for lubricating systems, the combination of a barrel provided with an internal shoulder adjacent one end thereof, a nipple for connnecting the other end of the barrel to a source of lubricant-supply, a coupling sleeve mounted to slide longitudinally on the outside of the barrel and provided with means whereby it may be detachably interlocked with a fitting, a removable seat for the fitting, disposed in the barrel and against the shoulder, a plunger removable from the barrel and held by said nipple so as to clamp the seat against the shoulder, a rotatable adjusting-sleeve held against longitudinal movement on the barrel, and a screw-thread connection between the sleeves adapted upon rotation of the adjusting-sleeve in one direction to effect relative longitudinal movement of the barrel and coupling-sleeve and clamp the fitting and seat together.

3. In a coupling for lubricating systems, the combination of a barrel provided with a flange, means for connecting one end of the barrel to a source of lubricant-supply, a coupling-sleeve longitudinally slidable on the barrel and provided with means at one end thereof whereby it may be detachably interlocked with a fitting, a seat connected to the other end of the barrel for engaging the outer end of the fitting, an adjusting sleeve rotatable on the barrel, a screw-thread connection between the sleeves adapted upon rotation of the adjusting-sleeve in one direction to effect relative longitudinal movement of the barrel and coupling-sleeve and clamp the fitting against the seat, and means for holding the adjusting-sleeve against longitudinal movement on the barrel comprising a collar screw-threaded to the other end of the adjusting sleeve and engaging one side of the flange, and a coacting member held in the adjusting sleeve and engaging the other side of said flange.

4. In a coupling for lubricating systems, the combination of a barrel provided with a peripheral flange, means for connecting the inner end of the barrel to a source of lubricant-supply, a coupling-sleeve longitudinally slidable on the barrel and provided with means at one end thereof whereby it may be detachably interlocked with a fitting, a seat connected to the other end of the barrel for engaging the outer end of the fitting, an adjusting-sleeve rotatable on the barrel and provided with an internal shoulder, a screw-thread connection between the sleeves adapted upon rotation of the adjusting-sleeve in one direction to effect relative longitudinal movement of the barrel and coupling-sleeve and clamp the fitting against the seat, and means for holding the sleeve against longitudinal movement on the barrel comprising a collar screw-threaded to the other end of the adjusting sleeve and engaging one side of the flange, and a ring held in the adjusting sleeve and against the shoulder by the collar and engaging the other side of the flange.

Signed at Columbus, Ohio, this 17th day of January, 1929.

J McELROY SMITH.